US 6,558,585 B1

(12) United States Patent
Zhang et al.

(10) Patent No.: US 6,558,585 B1
(45) Date of Patent: May 6, 2003

(54) TECHNIQUES FOR ELECTRODE POLING OF ELECTRO-OPTIC POLYMERS TO ELIMINATE POLING INDUCED OPTICAL LOSS AND POLING INDUCED DAMAGE TO ELECTRO-OPTIC CHROMOPHORES

(75) Inventors: Hua Zhang, Los Angeles, CA (US); Min-Cheol Oh, Glendale, CA (US); William Steier, San Marino, CA (US); Harold R. Fetterman, Pacific Palisades, CA (US); Joseph Michael, Los Angeles, CA (US)

(73) Assignee: Pacific Wave Industries, Inc., Los Angeles, CA (US)

( * ) Notice: Subject to any disclaimer, the term of this patent is extended or adjusted under 35 U.S.C. 154(b) by 5 days.

(21) Appl. No.: 09/704,955

(22) Filed: Nov. 2, 2000

(51) Int. Cl.$^7$ ................................................. B29D 11/00
(52) U.S. Cl. .................. 264/1.27; 205/122; 216/24; 264/435; 264/449; 264/85; 385/3
(58) Field of Search ................ 264/1.1, 1.27, 264/2.6, 2.7, 81, 85, 435, 436, 1.36, 449; 385/2, 3, 131, 132; 205/118, 122; 216/24

(56) References Cited

U.S. PATENT DOCUMENTS

| 3,821,182 A | 6/1974 | Baird, Jr. et al. |
| 3,879,330 A | 4/1975 | Lustig |
| 3,932,693 A | 1/1976 | Shaw et al. |
| 4,048,428 A | 9/1977 | Baird, Jr. et al. |
| 4,064,296 A | 12/1977 | Bornstein et al. |
| 4,284,671 A | 8/1981 | Cancio et al. |
| 4,837,293 A | 6/1989 | Silvis et al. |
| 4,914,138 A | 4/1990 | Percec et al. |
| 4,945,134 A | 7/1990 | Wallace et al. |
| 5,006,285 A * | 4/1991 | Thackara et al. ........... 264/1.27 |
| 5,017,411 A | 5/1991 | Chen-Tsai et al. |
| 5,039,751 A | 8/1991 | Wallace et al. |
| 5,093,466 A | 3/1992 | Patton et al. |
| 5,100,589 A * | 3/1992 | Ticknor ..................... 264/1.27 |
| 5,223,603 A | 6/1993 | Patton et al. |
| 5,322,986 A * | 6/1994 | Nutt |
| 5,370,937 A | 12/1994 | Lee et al. |
| 5,440,446 A | 8/1995 | Shaw et al. |
| 5,500,302 A | 3/1996 | Phillips et al. |
| 5,515,463 A * | 5/1996 | Hahn |
| 5,609,555 A | 3/1997 | Lee et al. |
| 5,637,365 A | 6/1997 | Carlblom |
| 5,686,126 A | 11/1997 | Noel et al. |
| 5,707,691 A | 1/1998 | Plester et al. |
| 5,725,909 A | 3/1998 | Shaw et al. |
| 5,885,672 A | 3/1999 | Phillips et al. |

OTHER PUBLICATIONS

Wang, Wenshen,, et al. "Push–Pull Poled Polymer Mach–Zehnder Modulators with a Single Microstrip Line Electrode," *IEEE Photonics Technology Letters*, vol. 11, No. 1, Jan. 1999.

* cited by examiner

Primary Examiner—Mathieu D. Vargot
(74) Attorney, Agent, or Firm—Henricks, Slavin & Holmes LLP

(57) ABSTRACT

Method for manufacturing an electro-optic polymer waveguide device including the step of electrode poling an electro-optic polymer material of the device in an oxygen-free environment. In a preferred embodiment, the electrode poling is performed at a temperature close to a glass transition temperature of the electro-optic polymer material.

18 Claims, 4 Drawing Sheets

OPTIMUM Tp FOR APC/CLD : 140~150°C
OPTIMUM Tp FOR PMMA/CLD : 80~90°C

TECHNIQUES FOR ELECTRODE POLING OF ELECTRO-OPTIC POLYMERS TO ELIMINATE POLING INDUCED OPTICAL LOSS AND POLING INDUCED DAMAGE TO ELECTRO-OPTIC CHROMOPHORES

STATEMENT REGARDING FEDERALLY SPONSORED RESEARCH AND DEVELOPMENT

This invention was made with support from the government of the United States of America under Contracts F49620-97-C-0064, F49620-97-1-0307, F49620-971-0491, F49620-98-C-0059, F49620-98-C-0077, F49620-990040 awarded by the United States Air Force. The government of the United States of America has certain rights in this invention as provided by these contracts.

BACKGROUND OF THE INVENTION

1. Field of Invention

The present invention relates generally to electro-optic polymer waveguide devices and methods for fabricating the same and, more particularly, to techniques for electrode poling of electro-optic polymers to eliminate poling induced optical loss and poling induced damage to electro-optic chromophores.

2. Description of the Related Art

An electro-optic polymer is formed with a host polymer and a chromophore molecule. The microscopic nonlinearity of the chromophores in the host material add up to produce the nonlinear property of the electro-optic polymer. However, when the chromophores are initially dispersed in the host material they are randomly oriented such that the nonlinearity of each molecule is canceled. In order to induce nonlinearity in a polymer film, the chromophores are aligned into desired positions by a poling process of applying an electric field across the electro-optic polymer at a high temperature.

During the poling process, a polymer cap layer is employed to prevent breakdown of the electrodes to ground when they are exposed to air and high voltages are applied. Notwithstanding, during such electrode poling, bleaching of the electro-optic polymer near the electrode polymer interface can occur. The bleaching is due to damage to the chromophores in the polymer. The bleaching typically extends several microns into the polymer and is dependent on the polarity of the electrode. This poling induced bleaching of the electro-optic polymer significantly increases the optical loss at both 1,300 nm and 1,550 nm in buried ridge optical waveguides. The increased loss is due to increased optical scattering and/or to loss of optical confinement in the waveguides. Accordingly, there is a need for a fabrication technique which addresses the problem of poling induced damage to electro-optic chromophores.

SUMMARY OF THE INVENTION

The principles of the present invention exploit the inventors' observation that the above-described bleaching is caused by the presence of oxygen during electrode poling and is likely due to the current flow through the polymer and the high electric fields during poling. When poled in air, oxygen readily diffuses through the polymer cap layer and through the cladding and active layers of the waveguides.

According to the present invention, the problem of poling induced damage to electro-optic chromophores is solved by performing the poling process in an oxygen free environment. By employing the technique of the present invention, no bleaching of the chromophores and no increased optical loss been observed as a result of electrode poling. It has been observed that waveguides poled in a nitrogen atmosphere have higher electro-optic coefficients and lower optical loss at both 1,300 nm and 1,550 nm because the chromophore damage is prevented. Thus, the present invention provides a method for preventing chromophore degradation caused by the current/voltage/oxygen bleaching process.

In an exemplary preferred embodiment of the present invention, the electro-optic polymer waveguide devices are placed in a nitrogen atmosphere for a sufficient amount of time to allow any oxygen already in place to diffuse out. The devices are then raised to the poling temperature and the poling voltages are applied for an amount of time required to align the chromophores. The temperature and poling voltage profiles over time are determined depending upon the polymer material and, more specifically, the thermal stability or glass transition temperature of the host polymer material. During poling the typical electric fields are 50 V/micron and the currents are 3 micro-ampere/cm. sq.

A method for manufacturing an electro-optic polymer waveguide device, in accordance with one embodiment of the present invention, includes the step of: electrode poling an electro-optic polymer material of the device in an oxygen-free environment. In a preferred embodiment, the oxygen-free environment comprises nitrogen, argon or helium.

An electro-optic polymer waveguide device, in accordance with another embodiment of the present invention, is manufactured according to the above-described method.

A method for manufacturing an electro-optic polymer waveguide device, in accordance with another embodiment of the present invention, includes the steps of: providing a substrate; providing a bottom electrode on top of the substrate; providing a lower cladding on top of the bottom electrode; providing a core layer of electro-optic polymer material on top of the lower cladding; removing portions of the core layer to form a waveguide structure; providing an upper cladding on top of the waveguide structure; providing an electrode structure on top of the upper cladding; providing a polymer cap layer on top of the electrode structure; and electrode poling the electro-optic polymer material in an oxygen-free environment.

In a preferred embodiment, the method also includes the steps of: removing the polymer cap layer and the electrode structure; providing a strip line electrode structure on top of the upper cladding; and electroplating the strip line electrode structure.

In another preferred embodiment, the step of removing portions of the core layer to form a waveguide structure includes the steps of: providing a protection layer on top of the core layer; patterning waveguide lines on the protection layer; and etching the protection layer to form the waveguide structure. An exemplary preferred protection layer has a thickness of less than 1 $\mu$m which allows for better control over the rib etching process. An exemplary preferred protection layer is made from a polymer solution diluted with methanol and is substantially uniform in thickness.

The above described and many other features and attendant advantages of the present invention will become apparent as the invention becomes better understood by reference to the following detailed description when considered in conjunction with the accompanying drawings.

BRIEF DESCRIPTION OF THE DRAWINGS

Detailed description of preferred embodiments of the invention will be made with reference to the accompanying drawings.

DETAILED DESCRIPTION OF THE PREFERRED EMBODIMENTS

The following is a detailed description of the best presently known mode of carrying out the invention. This description is not to be taken in a limiting sense, but is made merely for the purpose of illustrating the general principles of the invention.

Figure 1:
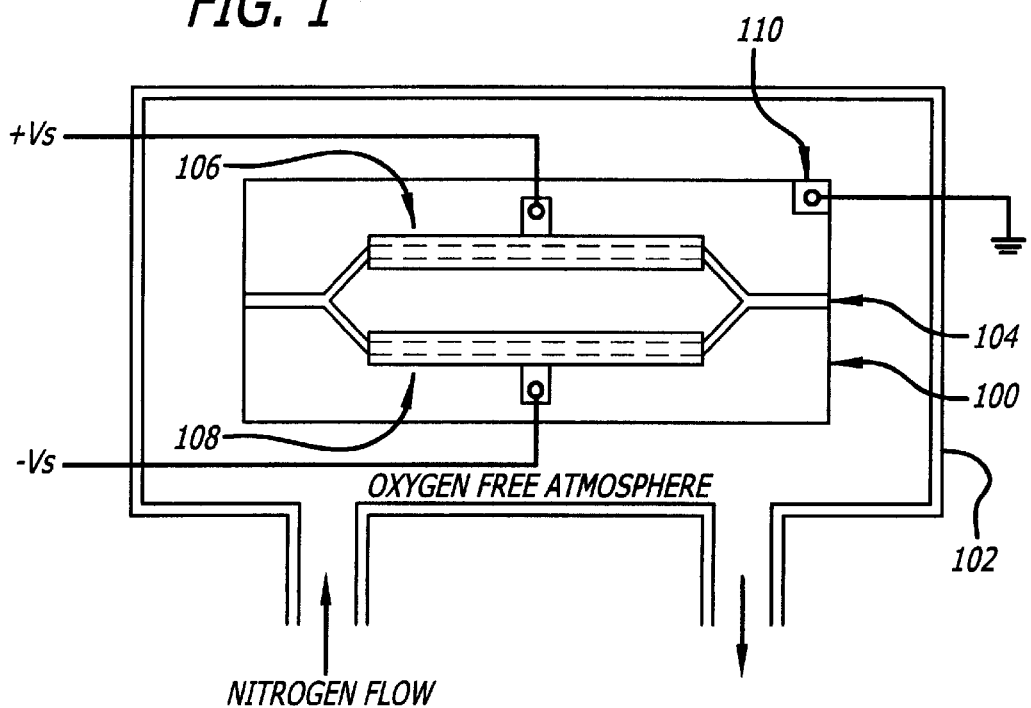
FIG. 1 is a schematic diagram illustrating electrode poling of an electro-optic polymer material in an oxygen-free environment according to an exemplary preferred method of the present invention.

Referring to FIG. 1, electrode poling according to the present invention is illustrated. An exemplary preferred electro-optic polymer waveguide device 100 is positioned within a container 102 through which a nitrogen flow (e.g., 99.99% pure $N_2$) is passed to create an oxygen free environment. It should be appreciated, however, that other gases (such as argon and helium) can also be employed to create the oxygen free environment within the container 102. The illustrated exemplary preferred electro-optic polymer waveguide device 100 includes an optical waveguide 104, top electrodes 106, 108 and a bottom electrode 110 configured as shown.

Figure 2A:
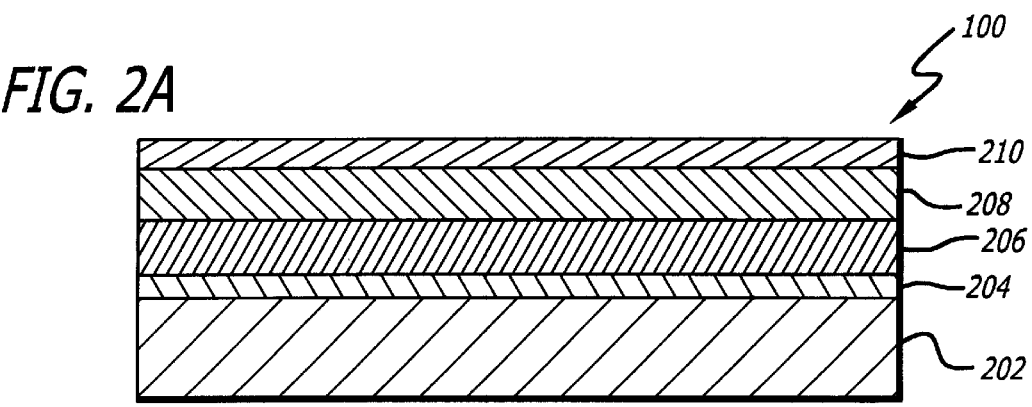
FIGS. 2A–2F illustrate steps of a fabrication procedure for an electro-optic polymer waveguide device according to an exemplary preferred embodiment of the present invention.
Figure 4:
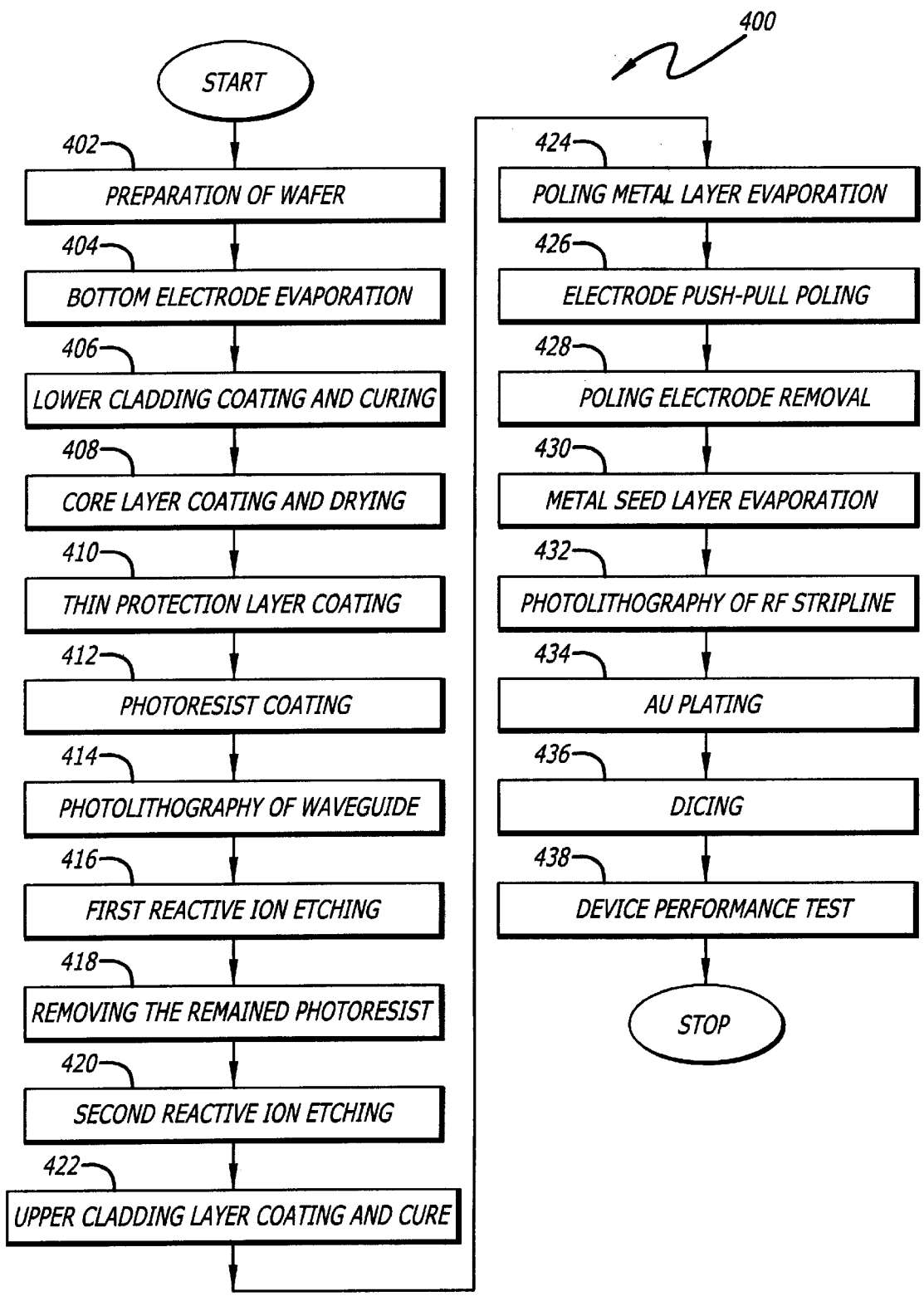
FIG. 4 is a flow chart of an exemplary preferred method for manufacturing an electro-optic polymer waveguide device according to the present invention.

Referring to FIG. 4, an exemplary preferred method 400 for manufacturing an electro-optic polymer waveguide device according to the present invention first includes the step 402 of preparing a substrate for the polymer optical modulator. By way of example, and referring also to FIG. 2A, an exemplary preferred substrate 202 comprises a wafer formed from silicon (Si), gallium arsenide (GaAs), indium phosphate (InP), glass or plastic. It should be understood, however, that the substrate 202 can be formed from other materials as well.

At step 404, a bottom electrode 204 of the microstrip line is formed, for example, by evaporating chromium-gold (Cr—Au) on top of the substrate 202. Alternative materials for Cr and Au comprise titanium (Ti) and silver (Ag), respectively. It should be appreciated, however, that the bottom electrode 204 can be formed from other materials as well.

At step 406, a lower cladding 206 is formed on top of the bottom electrode 204. The lower cladding 206 comprises a material which has good adhesion to the underlying metal layer (e.g., Au) and a high breakdown voltage so that it can withstand high electric fields at high temperatures. For example, the lower cladding 206 comprises a UV-curable polymer which is coated on the Au ground plane and cured. An exemplary preferred lower cladding 206 is approximately 2.5 $\mu$m in thickness and formed from UV15 which is a low shrinkage, optically clear, curable epoxy adhesive available from Master Bond, Inc., 154 Hobart St., Hackensack, N.J. 07601. Preferably, the UV15 layer is baked—at a temperature close to the poling temperature (e.g., 150° C.)—to increase the hardness of the film.

At step 408, a core layer 208 of electro-optic polymer material is formed on top of the lower cladding 206. In a preferred embodiment of the method 400, an electro-optic polymer material, APC/CLD, is coated on top of the lower cladding 206 to form the core layer 208, and is dried in a vacuum oven at room temperature for approximately eight (8) hours. APC is an acronym of Amorphous PolyCarbonate. CLD means a ring-locked phenyltetraene bridged chromophore. It should be appreciated, however, that any electro-optic polymer material can be employed for the core layer 208. Preferably, the thickness of the core layer 208 is between 1.5 $\mu$m and 8.0 $\mu$m. An exemplary preferred core layer 208 is approximately 2.5 $\mu$m in thickness.

At steps 410–420, portions of the core layer 208 are removed to form a waveguide structure. At step 410, and referring also to FIG. 2A, a thin protection layer 210 is formed on top of the core layer 208. The protection layer 210 comprises a material which does not attack or dissolve the core layer 208. Preferably, the material is curable with a small amount of UV doses. In a preferred embodiment of the method 400, a UV15 solution, diluted with methanol, is coated over the core layer 208 to form a protection layer 210 with a smooth surface and uniform thickness which is preferably less than 1.0 $\mu$m. An exemplary preferred protection layer 210 is approximately 0.6 $\mu$m in thickness.

Figure 2B:
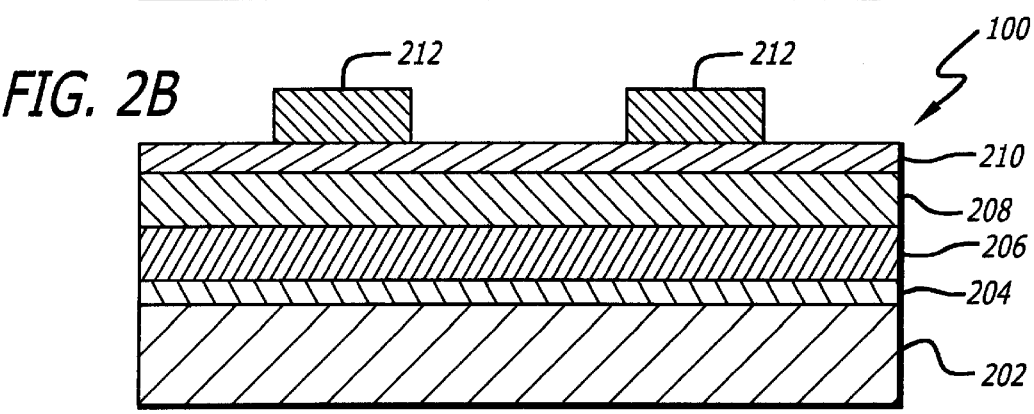
Figure 2C:
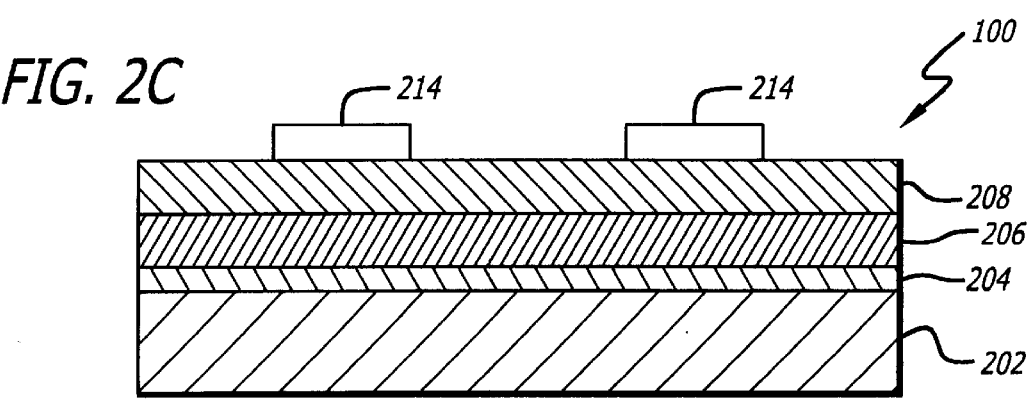
Figure 2D:
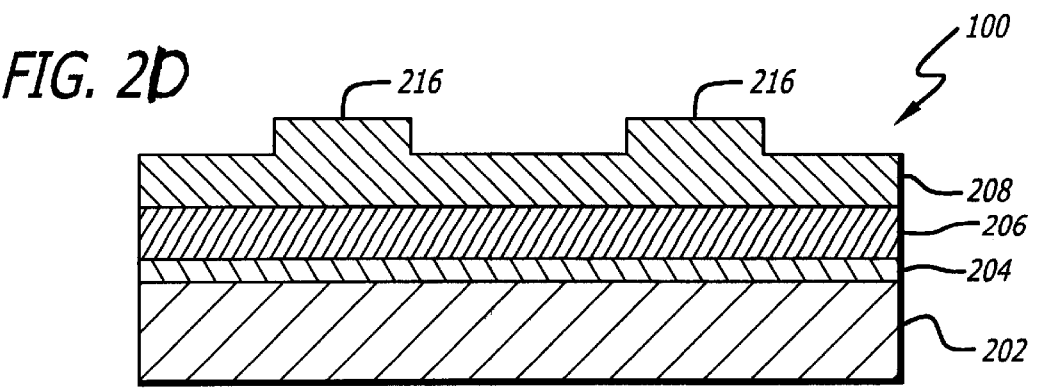

At steps 412 and 414, and referring also to FIG. 2B, waveguide lines 212 (e.g., photoresist) are formed on top of the protection layer 210 employing standard photolithography techniques. At step 416, and referring also to FIG. 3C, the (UV15) protection layer 210 is etched, e.g., by oxygen reactive ion etching (RIE), to form a rib structure 214 which is preferably 0.2–3.0 $\mu$m in height. An exemplary preferred rib structure 214 is approximately 0.4 $\mu$m in height. At step 418, after the first RIE, the photoresist residue is removed by using a developer. At step 420, and referring also to FIG. 2D, the waveguide pattern 214 in the (UV15) protection layer 210 is transferred into the (APC/CLD) core layer 208 by a second RIE, etching the whole surface to form rib waveguides 216. In a preferred embodiment, the etch rate of the protection layer 210 is faster than that of the core layer 208, as is the case with UV15 and APC/CLD.

Figure 2E:
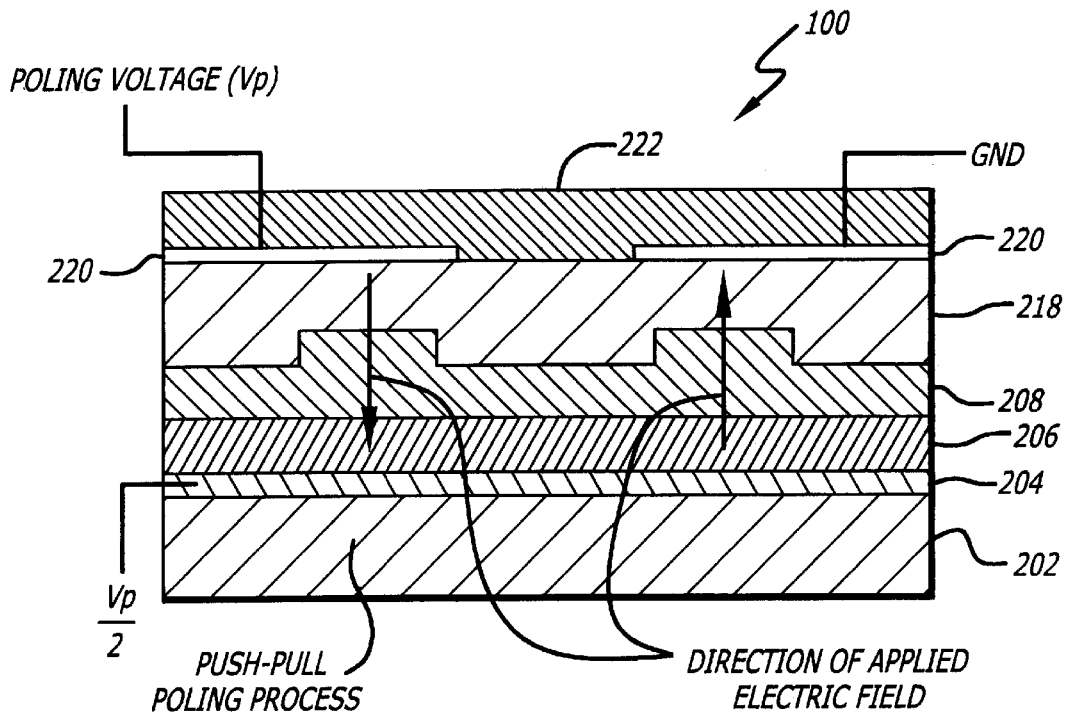

At step 422, and referring also to FIG. 2E, an upper cladding 218 is formed on top of the waveguide structure 216. The upper cladding 218 comprises a material which does not attack or dissolve the core layer 208 and which has a high breakdown voltage so that it can withstand high electric fields at high temperatures. Preferably, the material requires a relatively small dosage of UV to cure (e.g., 2 seconds exposure to 300 W-cm UV lamp with spherical reflector element) and provides a very hard film after the crosslinking. For example, the upper cladding 218 comprises the UV-curable acrylate polymer, UFC-170, made by URAY of Hwasung-goon, Kyungki-do, Korea. The UFC-170 polymer does not dissolve the APC/CLD core layer 208 and requires a relatively small dosage of UV exposure to be cured and gives very hard film after the UV assisted curing.

At step 424, an electrode structure 220 is formed on top of the upper cladding 218. The electrode structure 220 is formed from a material which is sufficiently conductive to operate at high frequencies for the electrode poling. In a preferred embodiment, an Au metal layer is deposited and patterned to make the electrode structure 220. Alternatively, Ag or any other sufficiently conductive material can be used to form the electrode structure 220. Prior to poling, a polymer cap layer 222 is provided on top of the electrode structure 220.

Figure 3:
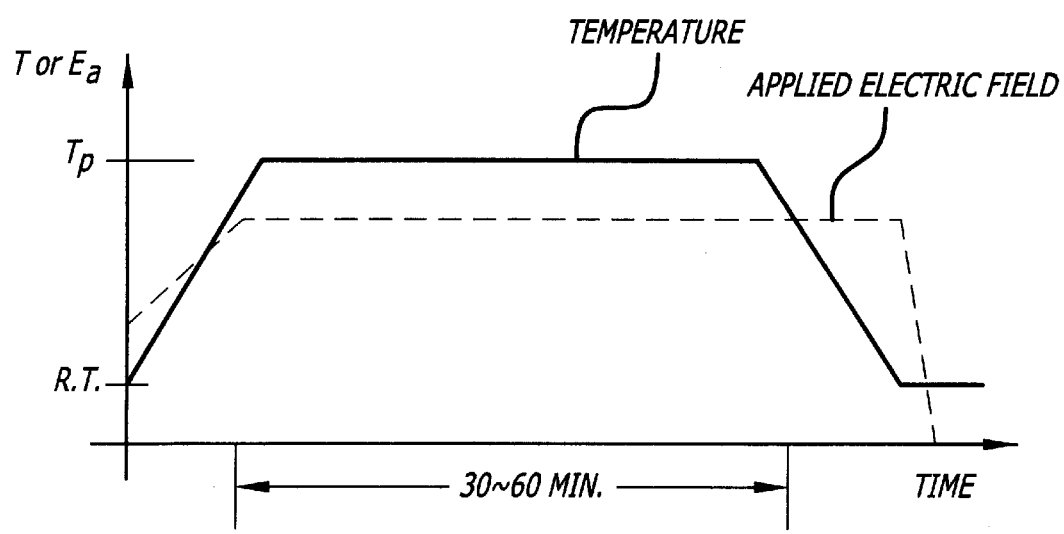
FIG. 3 illustrates typical temperature and electric field applied during the poling process according to an exemplary preferred embodiment of the present invention.

At step 426, electrode poling of the electro-optic polymer material is performed in an oxygen-free environment, and preferably at a temperature close to a glass transition temperature of the electro-optic polymer material. In an exemplary preferred embodiment of the present invention, temperature and applied electric field profiles such as those illustrated in FIG. 3 are used for the electrode poling, with the poling temperatures being determined depending upon the glass transition temperature of the electro-optic polymer materials. Preferably, the electrode poling is performed for approximately 30–60 minutes as shown in FIG. 3. In a preferred embodiment, the electrode poling comprises applying an electric field of approximately 80–100 V/$\mu$m across the polymer layers. In an exemplary preferred embodiment, the electrode poling comprises a push-pull poling process as illustrated in FIG. 2E.

By way of example, and referring again to FIG. 1, the sample is enclosed in the container 102 where nitrogen or argon is purged to keep the atmosphere oxygen free. The temperature of the sample is raised to about 145° C. which is close to the glass transition temperature of the electro-optic polymer material. Then, a high electric field of about 80–100 V/$\mu$m is applied across the polymer layers to pole the APC/CLD so as to possess the electro-optic effect.

Figure 2F:
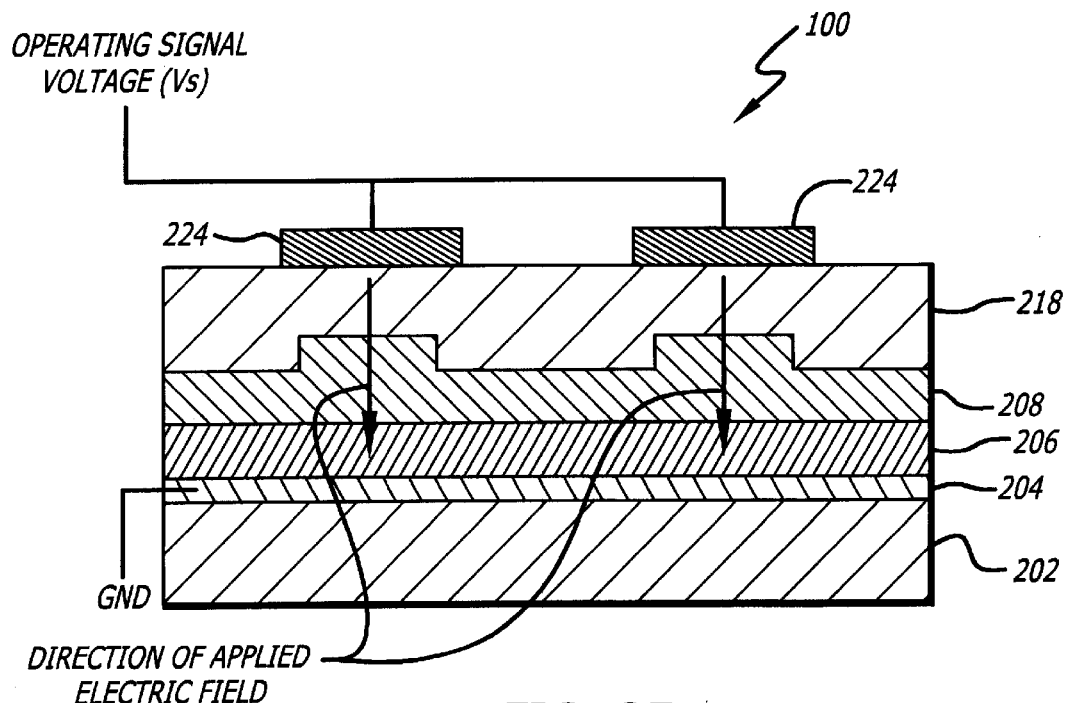

Referring again to FIG. 4, at step 428, the polymer cap layer 222 and the electrode structure 220 are removed. At steps 430 and 432, and referring also to FIG. 2F, a strip line electrode structure (or upper micro-strip electrode) 224 is formed on top of the upper cladding 218. At step 434, the strip line electrode structure 224 is electroplated (with Au, for example) to increase the electrode thickness. In an exemplary preferred embodiment, the strip line electrode structure 224 is electroplated to a electrode thickness of approximately 3 $\mu$m. At step 436, the end facet of the waveguide is diced with a (nickel) blade for the light coupling. At step 438, the resulting device is performance tested as needed.

Although the present invention has been described in terms of the preferred embodiments above, numerous modifications and/or additions to the above-described preferred embodiments would be readily apparent to one skilled in the art. It is intended that the scope of the present invention extend to all such modifications and/or additions.

We claim:

1. A method for manufacturing an electro-optic polymer waveguide device formed with a host electro-optic polymer material and a chromophore molecule, the method comprising the step of:
   electrode poling the electro-optic polymer material of the device in an oxygen-free environment comprising nitrogen or argon to prevent chromophore bleaching.

2. The method for manufacturing an electro-optic polymer waveguide device of claim 1, wherein the step of electrode poling comprises:
   electrode push-pull poling.

3. An electro-optic polymer waveguide device manufactured according to the method of claim 1.

4. A method for manufacturing an electro-optic polymer waveguide device, the method comprising the steps of:
   providing a substrate;
   providing a bottom electrode on top of the substrate;
   providing a lower cladding on top of the bottom electrode;
   providing a core layer of electro-optic polymer material on top of the lower cladding;
   removing portions of the core layer to form a waveguide structure;
   providing an upper cladding on top of the waveguide structure;
   providing an electrode structure on top of the upper cladding;
   providing a polymer cap, layer on top of the electrode structure; and
   electrode poling the electro-optic polymer material in an oxygen-free environment.

5. The method for manufacturing an electro-optic polymer waveguide device of claim 4, further comprising the steps of:
   removing the polymer cap layer and the electrode structure; and
   providing a strip line electrode structure on top of the upper cladding.

6. The method for manufacturing an electro-optic polymer waveguide device of claim 5, further comprising the step of:
   electroplating the strip line electrode structure.

7. The method for manufacturing an electro-optic polymer waveguide device of claim 4, wherein the lower cladding comprises a polymer material which adheres to the bottom electrode.

8. The method for manufacturing an electro-optic polymer waveguide device of claim 4, wherein the step of removing portions of the core layer to form a waveguide structure comprises the steps of:
   providing a protection layer on top of the core layer;
   patterning waveguide lines on the protection layer; and
   etching the protection layer to form the waveguide structure.

9. The method for manufacturing an electro-optic polymer waveguide device of claim 8, wherein the protection layer comprises a material which does not dissolve the core layer.

10. The method for manufacturing an electro-optic polymer waveguide device of claim 8, wherein the protection layer comprises a polymer solution diluted with methanol.

11. The method for manufacturing an electro-optic polymer waveguide device of claim 8, wherein the protection layer provided on top of the core layer has a thickness of less than 1 $\mu$m.

12. The method for manufacturing an electro-optic polymer waveguide device of claim 11, wherein the protection layer is substantially uniform in thickness.

13. The method for manufacturing an electro-optic polymer waveguide device of claim 4, wherein the upper cladding comprises a polymer material.

14. The method for manufacturing an electro-optic polymer waveguide device of claim 4, wherein the upper cladding comprises a material which does not dissolve the core layer.

15. The method for manufacturing an electro-optic polymer waveguide device of claim 4, wherein the step of electrode poling is performed at a temperature close to a glass transition temperature of the electro-optic polymer material.

16. The method for manufacturing an electro-optic polymer waveguide device of claim 15, wherein the step of electrode poling is performed for approximately 30–60 minutes.

17. The method for manufacturing an electro-optic polymer waveguide device of claim 4, wherein the step of electrode poling comprises the step of:
   applying an electric field of approximately 80–100 V/$\mu$m across the polymer layers.

18. The method for manufacturing an electro-optic polymer waveguide device of claim 6, wherein the strip line electrode structure is electroplated to a thickness of approximately 3 $\mu$m.

* * * * *